May 1, 1956 — A. W. LUDWIG — 2,744,154

INSULATED FENCE POST

Filed May 18, 1953

INVENTOR
Arthur W. Ludwig

BY
AGENT

United States Patent Office 2,744,154
Patented May 1, 1956

2,744,154

INSULATED FENCE POST

Arthur W. Ludwig, Winlock, Wash.

Application May 18, 1953, Serial No. 355,638

3 Claims. (Cl. 174—158)

This invention relates generally to electric fences for the isolation of farm animals in desired areas of the farm.

More particularly this invention provides an improved post for electric fences wherein the post itself is insulated at the points of electric wire support and wherein the electric wires may be laid in position on the post to be secure thereon and insulated therefrom without the requirement of securing additional insulators to the post nor tieing of the electric wires to the insulators.

Electric fences are common and well known on American farms and are coming into more general use because of their effectiveness in confining farms animals in desired farm areas. Previous fences were required to be mechanically strong and high (as well as low) enough to discourage the passage of farm animals. The fences were therefore of a very permanent nature and required substantial construction features.

Electric fences on the other hand can be of lighter construction because all that is necessary is an insulating supporting structure for two fence wires that can be charged to an electric potential which will sufficiently sting an animal coming into contact therewith to cause the animal to learn quickly to avoid the fence.

The wires can be charged with either a steady, pulsating, or alternating voltage but since the electricity supply for the fence is well known and no part of my invention, it will not be described here.

It is to the point however that permanent fence rows not only interfere with the tillage of the soil and the planting and recovery of crops but are also great offenders in being permanent nurseries for unwanted vegetation and rodents of all kinds. It is therefore highly desirable that fences be of a temporary nature. It is also important that such temporary fences be constructed in such a manner that they can be readily moved or removed and stored and that a minimum of labor or destruction of material is involved in such action. It is readily seen that the common practice of setting wooden posts in the ground in the usual way and securing glass or porcelain insulators to the posts with large nails or screws, then stringing the wire and finally tieing the wire to the insulators with tie wires leaves much to be desired.

It is therefore a principal object of this invention to provide an insulated post for an electric fence which will securely hold the wire insulatedly spaced from the ground as desired and which requires no tieing of the wire to the post.

It is a second object to provide such a post that if the fence wire is stretched along the line of the proposed fence, the posts may be engaged with the fence wires, spaced as desired along the fence wires and then thrust into the ground to support the fence wires in their desired locations.

It is a third object to provide such a post wherewith the fence can be quickly dismantled by a reverse of the above procedure without the loss or destruction of any part of the fence.

How these and other objects are attained will be made clear by the following description referring to the attached drawing in which Fig. 1 is a fragmentary side elevation of an electric fence during erection.

Like numerals of reference refer to like parts in the several figures of the drawing.

Figure 1:
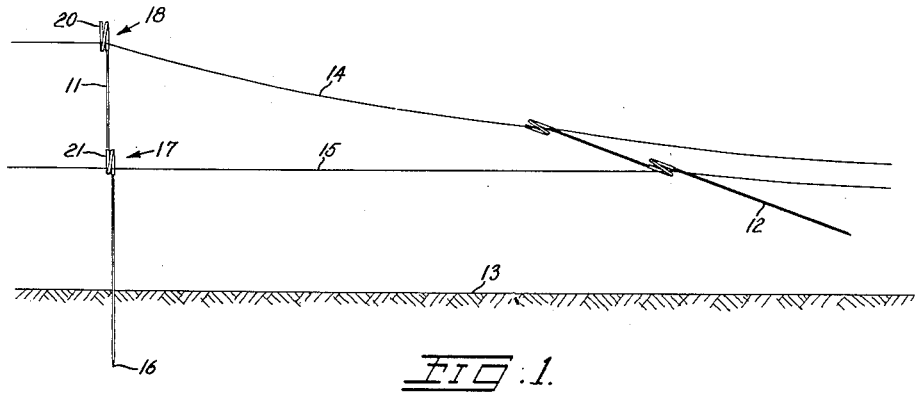
Figure 2:
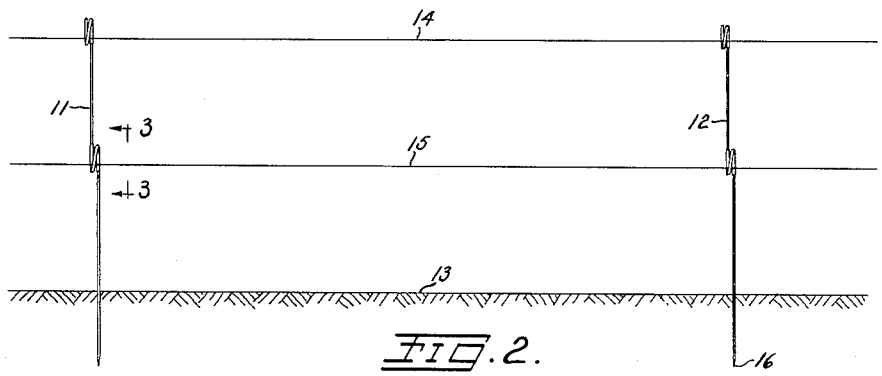
Fig. 2 is similar to Fig. 1 but with the wire and post in final position.
Figure 3:
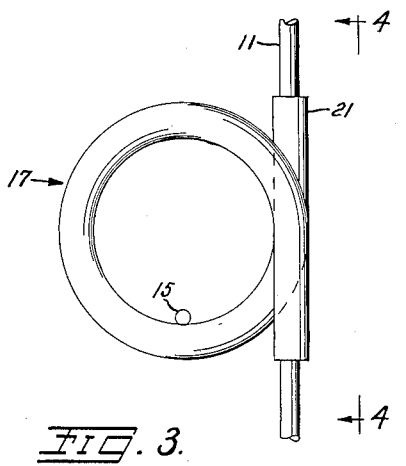
Fig. 3 is an enlarged view along the line 3—3 of Fig. 1.

Referring now to the attached drawing two of the insulated fence posts of my invention are indicated by the reference numerals 11 and 12 in Figs. 1 and 2, in which the ground level is indicated at 13 and the electrically chargable smooth galvanized steel fence wires are indicated by numerals 14 and 15.

The insulated fence post 11 of my invention is shown in a preferred form comprising a five foot section of about three-eighths inch diameter cold rolled mild steel rod, having a point 16 formed at one end; a first straight section extending about thirty inches from the pointed end of the rod; a single loose turn 17 about two inches in mean diameter formed in the rod at the upper end of the first straight section; a second straight section about eighteen inches long above the turn 17; and a second loose turn 18 formed in the rod at its upper end.

Figure 4:
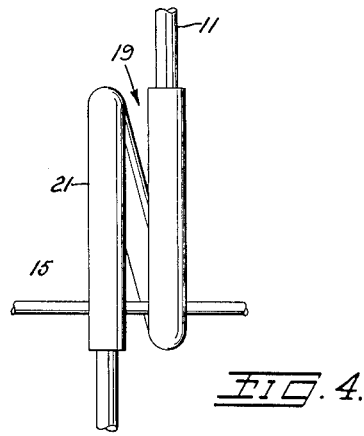
Fig. 4 is an enlarged view along the line 4—4 of Fig. 2.

The expression "loose turn" is intended to indicate that the straight sections of the rod are laterally spaced, as shown at 19, Fig. 4, as they bend to form a loop, 17 or 18.

At each of the loops 17 and 18, the rod is covered with close fitting insulating sleeves 20 and 21 formed preferably of a tube of oil resisting synthetic rubber-like material, such as "Neoprene" made by the Du Pont Company of Wilmington, Delaware. However, other natural rubber or plastic materials are suitable for this close fitting insulating tubing.

The rod can be given a rust resisting surface treatment by galvanizing before forming or it can be painted on its straight sections with a rust resisting paint after forming and the insulating sleeves 20 and 21 are in place at turns 18 and 17.

Referring again to Fig. 1 it is assumed that end posts, not shown, for the fence are secured in the desired terminal locations for the fence and wires 14 and 15 have been stretched along the line of the proposed fence. Post 11 of this invention is shown as properly installed in its final desired location with wires 14 and 15 resting on insulating tubes 20 and 21 respectively and threaded through loops 18 and 17 of post 11. Post 11 has been thrust into the ground about one foot for satisfactory support.

Also in Fig. 1, post 12 is shown in the process of installation which is accomplished by laying post 12 parallel along wire 15 and moving the post laterally so that the wire 15 passes into the lower loop of post 12 through the opening indicated at 19 in Fig. 4. Then by rotating post 12 clockwise about its lower loop to its position shown in Fig. 1 wire 15 is engaged in or threaded through the lower loop of post 12.

Wire 14 is then hooked under the upper loop of post 12 and lifted upward on the left side of post 12 until wire 14 enters the upper loop of post 12 through the opening indicated at 19 in Fig. 4.

Now both wires 14 and 15 are in position in the respective loops of post 12 as shown in Fig. 1 and post 12 can be straightened up to a vertical position and thrust into the ground to its final position shown in Fig. 2.

In this way it is seen that a secure and attractive fence is constructed without tools.

Similarly by pulling the posts and disengaging the posts from the wires in a reverse manner from that described for setting up the fence, the fence can be taken down without tools and without the loss or destruction of any materials.

And of course, the fence may be set up, moved, or removed, as many times as desired.

Having thus cited some of the objects or advantages of the insulated fence post of this invention, described the form and construction of a preferred form of my invention, and illustrated its use, I claim:

1. An insulating post for an electric fence having a plurality of spaced parallel electrically charged fence wires, said post comprising a length of metal rod having a plurality of spiral turns formed therein in longitudinally spaced relation therealong, the axes of said spiral turns being parallel and generally perpendicular to said rod, a plurality of insulating sleeves positioned on said rod throughout said turns and the adjacent ends of each of said turns being axially spaced to permit the passage of a respective one of said fence wires between the ends of a respective one of said insulating sleeves over a respective one of said turns.

2. An insulating post for an electric fence having a pair of spaced parallel electrically charged fence wires, said post comprising a single length of metal rod with a pair of axially parallel spaced single spiral turns formed in said rod between the ends thereof, said spiral turns being covered with a layer of insulating material and the adjacent ends of each of said turns being spaced axially of the respective turn to permit the passage of one of said fence wires therebetween.

3. An insulating post for an electric fence having a pair of spaced parallel electrically charged fence wires, said post comprising a length of metal rod having a pair of spaced spiral turns formed therealong, the axes of said spiral turns being parallel and perpendicular to the longitudinal direction of said post, each of said spiral turns being covered with a respective tubular layer of insulating material throughout its length and the ends of each of said spiral turns being axially spaced to permit a respective one of said wires to pass therebetween, whereby without the use of tools or other fastening means said spaced parallel electric fence wires can be positioned respectively to be insulatedly supported on said post by holding said wires and said post in general alignment moving each of said wires respectively between the ends of its respective spiral turn of said post and then moving said post to a position generally perpendicular to said wire with the axes of said turns parallel to said wires.

References Cited in the file of this patent

UNITED STATES PATENTS

| | | |
|---|---|---|
| 573,101 | O'Neill | Dec. 15, 1896 |
| 2,269,996 | Webster | Jan. 13, 1942 |
| 2,396,512 | Johnson | Mar. 12, 1946 |
| 2,429,857 | Verner | Oct. 28, 1947 |
| 2,530,247 | Koonz | Nov. 14, 1950 |
| 2,536,341 | Asher | Jan. 2, 1951 |
| 2,650,454 | Wundenger | Sept. 1, 1953 |

FOREIGN PATENTS

| | | |
|---|---|---|
| 21,248 | Great Britain | Apr. 27, 1911 |
| 252,969 | Switzerland | Oct. 16, 1948 |